(12) United States Patent
Hupertz

(10) Patent No.: US 6,550,501 B2
(45) Date of Patent: Apr. 22, 2003

(54) TUBE FORMED OF PROFILED STRIP

(75) Inventor: Günter Hupertz, Wenden (DE)

(73) Assignee: Westfalia Metallformtechnik GmbH & Co., Hilchenbach (DE)

(*) Notice: Subject to any disclaimer, the term of this patent is extended or adjusted under 35 U.S.C. 154(b) by 0 days.

(21) Appl. No.: 10/100,498

(22) Filed: Mar. 18, 2002

(65) Prior Publication Data

US 2002/0129862 A1 Sep. 19, 2002

(30) Foreign Application Priority Data

Mar. 19, 2001 (DE) .......................... 101 13 182

(51) Int. Cl.⁷ ................................. F16L 11/16
(52) U.S. Cl. .................. 138/129; 138/135; 138/136
(58) Field of Search ....................... 138/135, 136, 138/134, 129, 154, 150

(56) References Cited

U.S. PATENT DOCUMENTS 605,587 A * 6/1898 Rudolph et al. ............. 138/136
2,402,497 A * 6/1946 Johnson ...................... 138/135

FOREIGN PATENT DOCUMENTS

DE     34 41 064     5/1986

OTHER PUBLICATIONS

US 2002/0148522 A1 Gunter Hupertz, Oct. 17, 2002.*

* cited by examiner

Primary Examiner—Patrick Brinson
(74) Attorney, Agent, or Firm—Herbert Dubno; Andrew Wilford

(57) ABSTRACT

A tube made of profiled strip has an inner edge and an outer edge parallel to the inner edge and projecting away from the inner edge. A double-thickness rib extends between the edges projects transversely in a direction from the strip. A channel extending between the rib and the outer edge opens transversely of the strip opposite to the direction in which the strip projects from the strip. The strip is formed into turns centered on an axis with the rib projecting radially outward. The channel opens radially inward, and the rib of each turn projects radially into the channel of an adjacent turn.

9 Claims, 3 Drawing Sheets

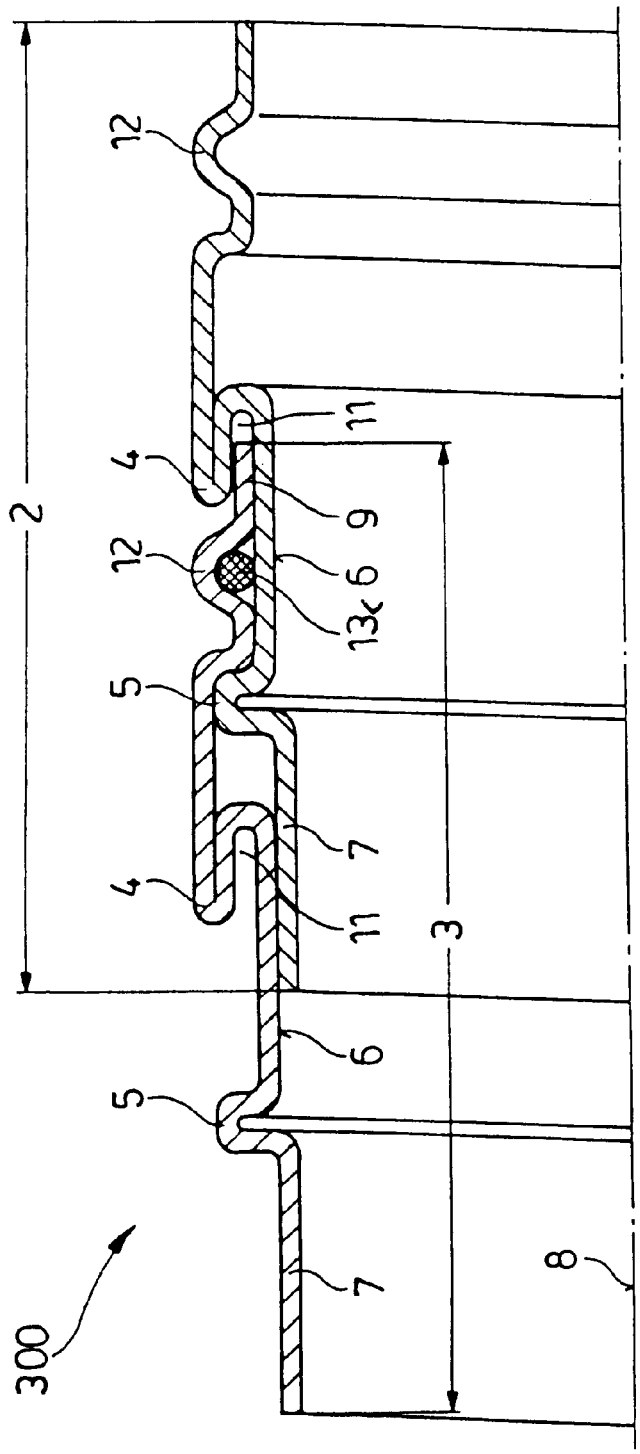
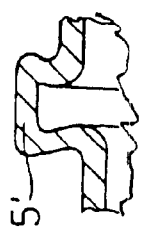
FIG 4A
Fig.5

1

TUBE FORMED OF PROFILED STRIP

FIELD OF THE INVENTION

The present invention relates to tubing. More particularly this invention concerns a multilayer tube formed of profiled strip.

BACKGROUND OF THE INVENTION

A multilayer tube formed of profiled strip is known from German patent document 3,441,064. The strip has inner and outer edges, is formed between them with a double-thickness outwardly directed lip defining an outwardly open inner slot, and is bent back under at its outer edge to form an inwardly open outer slot with the outer edge extending backward toward the inner edge. Where two turns of the strip material overlap, the outwardly directed double-thickness lip of each turn is engaged in the outer slot under the bent-back outer lip of the adjacent turn. Thus the turns are locked together and can shift limitedly relative to each other to allow the tube to be bent. What is more the interfit is so tight that the tube can easily be sealed to safely transport gas or liquid under pressure.

The disadvantage of this system is that, when stretched, relatively wide radially outwardly directed openings are formed that can catch and fill with dirt and the like. Furthermore the tube thus formed is at most two layers thick in many locations so it is not strong. The inner surface of the tube is shingled, with overlapping sections that make flow in the tube turbulent.

OBJECTS OF THE INVENTION

It is therefore an object of the present invention to provide an improved tube made of profiled strip.

Another object is the provision of such an improved tube made of profiled strip which overcomes the above-given disadvantages, that is which has smooth outer and inner surfaces even when bent or extended, and which is very strong.

SUMMARY OF THE INVENTION

A tube made of profiled strip has according to the invention an inner edge and an outer edge parallel to the inner edge and projecting away from the inner edge. A double-thickness rib extending between the edges projects transversely in a direction from the strip. A channel extending between the rib and the outer edge opens transversely of the strip opposite to the direction in which the rib projects from the strip. The strip is formed into turns centered on an axis with the rib projecting radially outward. The channel opens radially inward, and the rib of each turn projects radially into the channel of an adjacent turn.

Such a tube is therefore made of a uniform-thickness strip of metal that is folded and bent to the desired shape, so it is extremely inexpensive to make and can be made at great speed, in part because the strip can be given its final shape before it is wound up into a tube. The tube seals as tightly as one using substantially more material and the turns are inter-locked such that, even if the tube has an oval or polygonal section, it is very strong while remaining relatively flexible.

According to the invention each outer edge radially outwardly overlies the channel of the adjacent strip and forms therewith a helicoidal compartment along which a seal extends. The channel can form with the rib a pair of helicoidal compartments each holding such an elastomeric seal.

The channel in accordance with the invention is formed with a double-thickness inner lip projecting toward the rib and forming a slot open parallel to the axis toward the rib and inner edge. The outer edge of each turn is axially slidable in the slot of an adjacent turn. The channel can further be formed with a double-thickness inner lip projecting toward the rib and forming a slot open parallel to the axis toward the rib and inner edge. The outer edge radially overlies the lip and the strip further is formed between the outer edge and the rib with an outer lip projecting parallel to the axis and axially slidable in the slot of the adjacent turn.

The strip according to the invention can be formed adjacent the outer edge with an inwardly open groove. A seal extending helicoidally in the groove of each turn radially inwardly engages an adjacent turn between the rib and the outer edge thereof.

BRIEF DESCRIPTION OF THE DRAWING

The above and other objects, features, and advantages will become more readily apparent from the following description, reference being made to the accompanying drawing in which:

FIG. 4A is a detail view of a variant on the system of FIG. 4; and

FIG. 5 is a view like FIG. 1 of a further embodiment of the invention.

SPECIFIC DESCRIPTION

Figure 1:
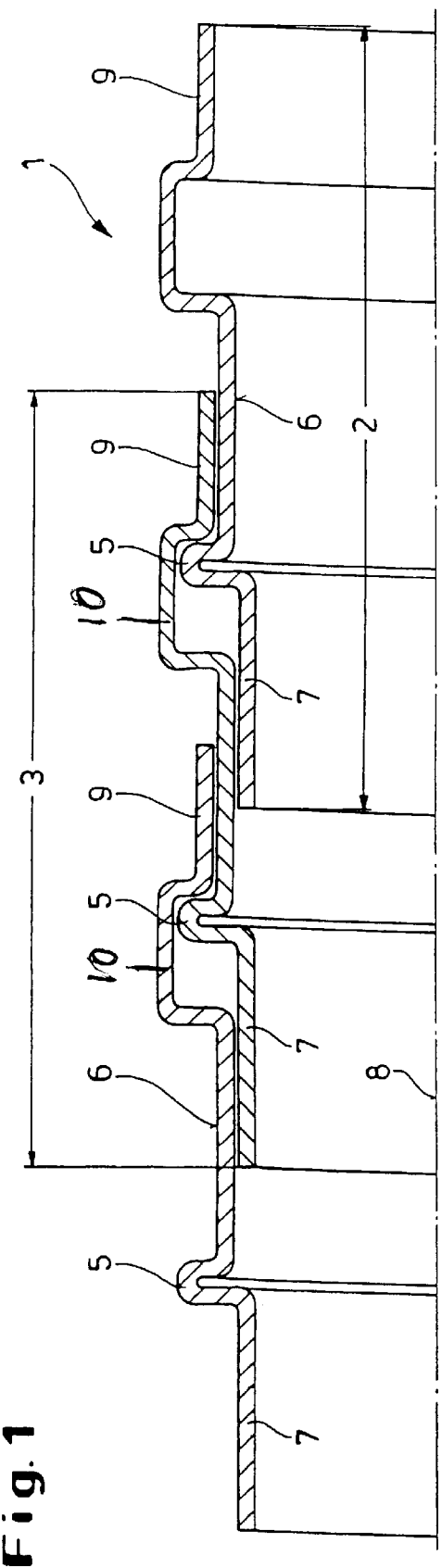
FIG. 1 is an axial section through a tube according to the invention.

As seen in FIG. 1 a tube 1 centered on an axis 8 is made of a plurality of turns 2 and 3 of metal strip. The strip has an inner edge portion 7 and forms a radially outwardly projecting double-thickness rib 5 having a pair of planar and annular faces directed axially oppositely. A cylindrical center portion 6 of slightly greater diameter than the inner edge portion 7 extends axially outward (to the right in FIG. 1) from the rib 5 to a radially inwardly open channel 10 having inner side surfaces facing each other axially and spaced apart by a distance equal to at least twice the axial dimension of the rib 5. An outer edge portion 9 extends cylindrically outward from the channel 10 and is of larger inside diameter than the center portion 6.

The rib 5 of each turn 2 or 3 fits in the channel 10 of the adjacent turn so that the respective inner edge portion 7 is axially slidable inside the adjacent middle portion 6 on one axial side and the opposite outer edge portion is axially slidable outside the middle portion 6 of the turn on the other axial side. Thus the turns 2 and 3 can move axially relative to each other. In FIG. 1 the tube 1 is shown at maximum extended length.

Figure 2:
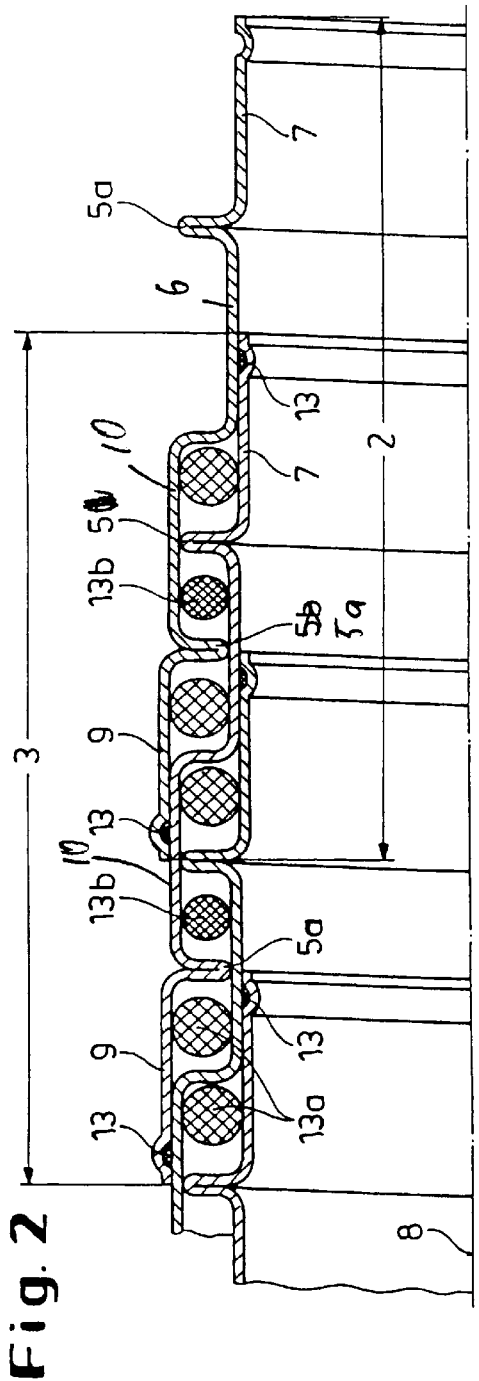
FIGS. 2, 3, and 4 are views like FIG. 1 of other embodiments of the tube in accordance with the invention.

In the arrangement of FIG. 2 the outer edge portion 9 is L-shaped and of larger diameter so that it can engage around the outside of the adjacent channel 10. The turns 2 and 3 form radially inwardly projecting ribs 5b that ride on the portions 6, forming three helicoidal chambers holding seal rings 13a and 13b. The inner and outer end portions 7 and 9 are formed with outwardly and inwardly open grooves holding further seals 13 that respectively ride on the inner faces of the portions 6 and outer faces of the channels 10.

Figure 3:
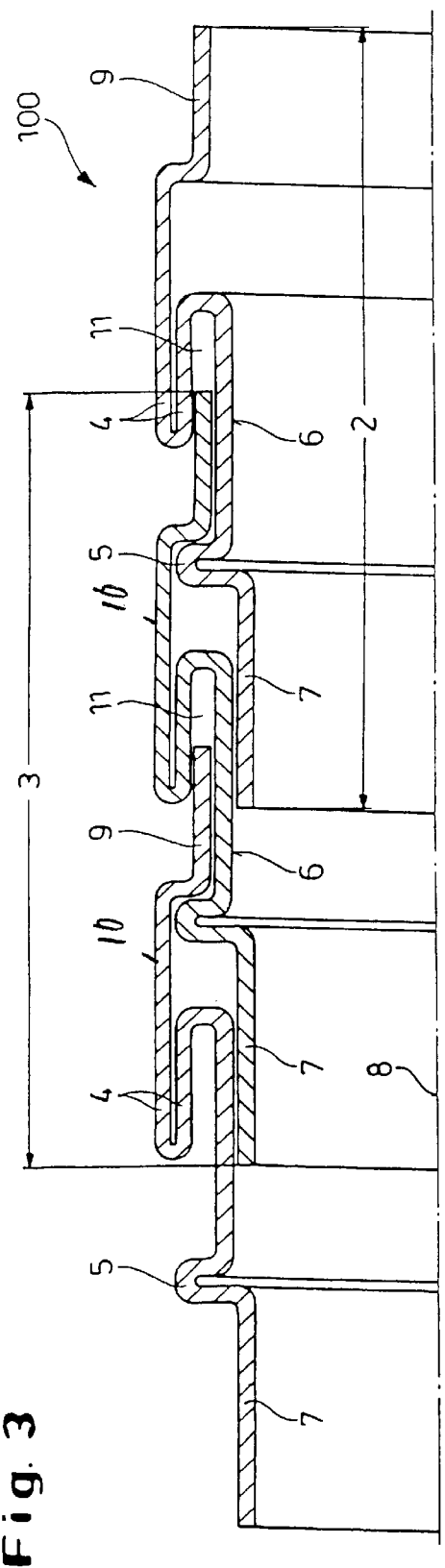

The system of FIG. 3 the tube 100 has an axially projecting double-thickness lip 4 formed on the channel 10 and forming an axially open slot 11 in which the outer end portion 9 can slide axially. This arrangement is very stable and locks the turns 2 and 3 together both radially and axially.

Figure 4:
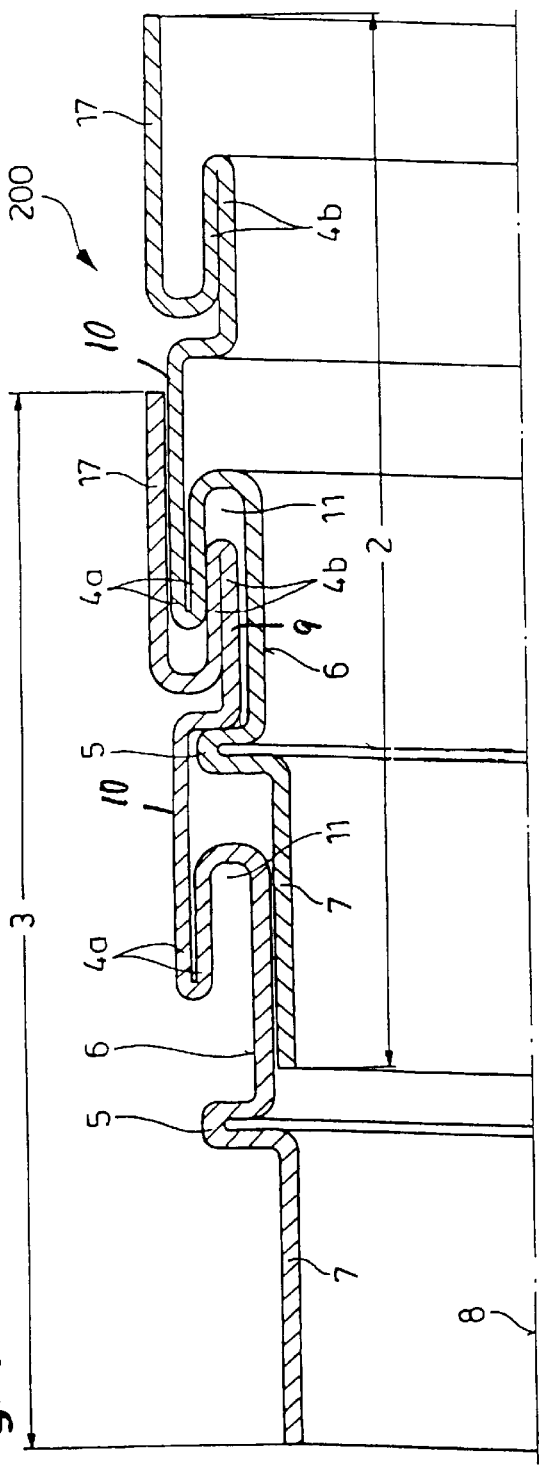

In FIG. 4 the outer edge portion 9 of the tube 200 is bent back as a double-thickness lip 4b fitting complementarily in the slot 11 and then extends at 17 outside the channel 10. It is also possible as shown in FIG. 4A for the rib 5' to be flared outward.

Finally, FIG. 5 shows a tube 300 substantially identical to that of FIG. 3 but where the outer edge portion 9 is formed with a radially inwardly open groove 12 holding a seal 13c.

I claim:

1. A tube made of profiled strip, the strip having;

an inner edge;

an outer edge parallel to the inner edge and projecting away from the inner edge;

a double-thickness rib extending between the edges, and projecting transversely in a direction from the strip; and a channel extending between the rib and the outer edge and open transversely of the strip opposite to the direction in which the rib projects from the strip, the strip being formed into turns centered on an axis with the rib projecting radially outward, the channel open radially inward, and the rib of each turn projecting radially into the channel of an adjacent turn.

2. The profiled-strip tube defined in claim 1 wherein each outer edge radially outwardly overlies the channel of the adjacent strip and forms therewith a helicoidal compartment.

3. The profiled-strip tube defined in claim 2, further comprising a seal extending along the compartment.

4. The profiled-strip tube defined in claim 1 wherein the channel forms with the rib a pair of helicoidal compartments.

5. The profiled-strip tube defined in claim 4, further comprising a seal extending along one of the compartments.

6. The profiled-strip tube defined in claim 4, further comprising respective seals extending along the compartments.

7. The profiled-strip tube defined in claim 1 wherein the channel is formed with a double-thickness inner lip projecting toward the rib and forming a slot open parallel to the axis toward the rib and inner edge, the outer edge of each turn being axially slidable in the slot of an adjacent turn.

8. The profiled-strip tube defined in claim 7 wherein the channel is formed with a double-thickness inner lip projecting toward the rib and forming a slot open parallel to the axis toward the rib and inner edge, the outer edge radially overlying the lip and the strip further being formed between the outer edge and the rib with an outer lip projecting parallel to the axis and axially slidable in the slot of the adjacent turn.

9. The profiled-strip tube defined in claim 1 wherein the strip is formed adjacent the outer edge with an inwardly open groove, the tube further comprising a seal extending helicoidally in the groove of each turn and radially inwardly engaging an adjacent turn between the rib and the outer edge thereof.

* * * * *